US012243330B2

(12) United States Patent
Kumazaki

(10) Patent No.: US 12,243,330 B2
(45) Date of Patent: Mar. 4, 2025

(54) VEHICLE CONTROL DEVICE, STORAGE MEDIUM FOR STORING COMPUTER PROGRAM FOR VEHICLE CONTROL, AND METHOD FOR CONTROLLING VEHICLE

(71) Applicant: TOYOTA JIDOSHA KABUSHIKI KAISHA, Toyota (JP)

(72) Inventor: Kenta Kumazaki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 240 days.

(21) Appl. No.: 18/176,063

(22) Filed: Feb. 28, 2023

(65) Prior Publication Data

US 2023/0415726 A1    Dec. 28, 2023

(30) Foreign Application Priority Data

Jun. 22, 2022    (JP) ................. 2022-100575

(51) Int. Cl.
| | | |
|---|---|---|
| *G06V 20/59* | (2022.01) | |
| *B60W 10/04* | (2006.01) | |
| *B60W 10/11* | (2012.01) | |
| *B60W 10/30* | (2006.01) | |
| *B60W 20/15* | (2016.01) | |
| *B60W 20/40* | (2016.01) | |

(Continued)

(52) U.S. Cl.
CPC .............. *G06V 20/59* (2022.01); *B60W 10/04* (2013.01); *B60W 10/11* (2013.01); *B60W 10/30* (2013.01); *B60W 20/15* (2016.01); *B60W 20/40* (2013.01); *B60W 30/194* (2013.01); *B60W 40/08* (2013.01); *B60W 2420/403* (2013.01); *B60W 2510/107* (2013.01); *B60W 2540/225* (2020.02); *B60W 2710/08* (2013.01)

(58) Field of Classification Search
CPC ..... G06V 20/59; G06V 20/597; B60W 10/04; B60W 10/11; B60W 10/30; B60W 20/15; B60W 20/40; B60W 30/194; B60W 40/08; B60W 2420/403; B60W 2510/107; B60W 2540/225; B60W 2710/08
See application file for complete search history.

(56) References Cited

U.S. PATENT DOCUMENTS

2009/0271079 A1    10/2009    Kobayashi et al.
2019/0138790 A1    5/2019    Matsumura et al.

FOREIGN PATENT DOCUMENTS

JP    2005076763 A    *    3/2005
JP    2009-264545 A         11/2009
(Continued)

*Primary Examiner* — Dale Moyer
(74) *Attorney, Agent, or Firm* — Sughrue Mion, PLLC

(57) ABSTRACT

A vehicle control device has a processor configured to estimate whether or not a driver is attempting to begin vehicle travel after a vehicle has been activated, based on a photographed image of an area near a driving seat, and to control an electrical oil pump to supply a second hydraulic pressure that is lower than a first hydraulic pressure which allows operation of a transmission having a frictional engagement element that can be engaged and disengaged by hydraulic pressure, when it has been estimated that the driver is not attempting to begin vehicle travel, or to control the electrical oil pump to supply the first hydraulic pressure to the transmission, when it has been estimated that the driver is attempting to begin vehicle travel.

5 Claims, 5 Drawing Sheets

(51) Int. Cl.
  *B60W 30/194* (2012.01)
  *B60W 40/08* (2012.01)

(56) References Cited

FOREIGN PATENT DOCUMENTS

| | | | | |
|---|---|---|---|---|
| JP | 2017-81299 A | 5/2017 | | |
| JP | 2017-207101 A | 11/2017 | | |
| JP | 2019-87150 A | 6/2019 | | |
| WO | WO-2015036664 A1 * | 3/2015 | .......... | B60W 30/194 |

* cited by examiner

VEHICLE CONTROL DEVICE, STORAGE MEDIUM FOR STORING COMPUTER PROGRAM FOR VEHICLE CONTROL, AND METHOD FOR CONTROLLING VEHICLE

FIELD

The present disclosure relates to a vehicle control device, a storage medium storing a computer program for vehicle control, and a method for controlling a vehicle.

BACKGROUND

Controlling devices for hybrid vehicles that have both engines and electric motors actuate an electrical oil pump immediately upon vehicle activation to supply hydraulic pressure at a level to allow operation of a transmission, which has a frictional engagement element that can be engaged and disengaged by hydraulic pressure. The vehicle is therefore always in a travel-capable state.

Japanese Unexamined Patent Publication No. 2009-264545, for example, proposes a vehicle control device that activates an electrical oil pump when a change of state in the vehicle has been detected, such as during opening and closing of vehicle doors. With this vehicle control device it is possible to create a state in which hydraulic pressure is supplied in an amount necessary for the hydraulic pressure system when the vehicle is started.

SUMMARY

The driver of a vehicle will not always start vehicle travel immediately after activating the vehicle. For example, after the vehicle has been activated, the driver may operate a navigation device to set a navigation route to the destination location for the vehicle, or may operate an air conditioner, or may talk on a cell phone.

The driver therefore decides the timing at which the vehicle begins to travel. Consequently, when the electrical oil pump is activated based on detection of the change of state of the vehicle as according to Japanese Unexamined Patent Publication No. 2009-264545, a longer time from activation of the vehicle until it begins to travel can potentially result in greater consumption of electric power while the electrical oil pump is actuated.

It is an object of the present disclosure to provide a vehicle control device that reduces consumption of electric power by the electrical oil pump during the period after the vehicle has been activated and until the driver attempts to begin vehicle travel.

One embodiment of the invention provides a vehicle control device. The vehicle control device has an estimating unit that estimates whether or not a driver is attempting to begin vehicle travel after a vehicle has been activated, based on a photographed image of an area near a driving seat; and a control unit that controls an electrical oil pump to supply a second hydraulic pressure that is lower than a first hydraulic pressure which allows operation of a transmission having a frictional engagement element that can be engaged and disengaged by hydraulic pressure, when it has been estimated by the estimating unit that the driver is not attempting to begin vehicle travel, or controls the electrical oil pump to supply the first hydraulic pressure to the transmission, when it has been estimated by the estimating unit that the driver is attempting to begin vehicle travel.

In this vehicle control device, preferably the estimating unit estimates an orientation of a face of the driver based on the image, and estimates that the driver is attempting to begin vehicle travel when the face of the driver is oriented toward a front of the vehicle for a first time period.

Also in this vehicle control device, preferably the estimating unit estimates that the driver is attempting to begin vehicle travel when the face of the driver is oriented toward the front of the vehicle for a second time period that is shorter than the first time period, if the temperature of oil that causes the transmission to operate is lower than a predetermined reference temperature.

According to another embodiment, a non-transitory storage medium storing a computer program for vehicle control is provided. The computer program for vehicle control causes a processor execute a process and the process includes estimating whether or not a driver is attempting to begin vehicle travel after a vehicle has been activated, based on a photographed image of an area near a driving seat, and controlling an electrical oil pump to supply a second hydraulic pressure that is lower than a first hydraulic pressure which allows operation of a transmission having a frictional engagement element that can be engaged and disengaged by hydraulic pressure, when it has been estimated that the driver is not attempting to begin vehicle travel, or controlling the electrical oil pump to supply the first hydraulic pressure to the transmission, when it has been estimated that the driver is attempting to begin vehicle travel.

Yet another embodiment of the invention provides a method for controlling a vehicle that is carried out by a vehicle control device. The method includes estimating whether or not a driver is attempting to begin vehicle travel after a vehicle has been activated, based on a photographed image of an area near a driving seat, and controlling an electrical oil pump to supply a second hydraulic pressure that is lower than a first hydraulic pressure which allows operation of a transmission having a frictional engagement element that can be engaged and disengaged by hydraulic pressure, when it has been estimated that the driver is not attempting to begin vehicle travel, or controlling the electrical oil pump to supply the first hydraulic pressure to the transmission, when it has been estimated that the driver is attempting to begin vehicle travel.

During the period after the vehicle has been activated and until it is estimated that the driver is attempting to begin vehicle travel, the vehicle control device of the disclosure can control the electrical oil pump to supply a hydraulic pressure that is lower than the hydraulic pressure which allows operation of the transmission, and can therefore reduce electric power consumption.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
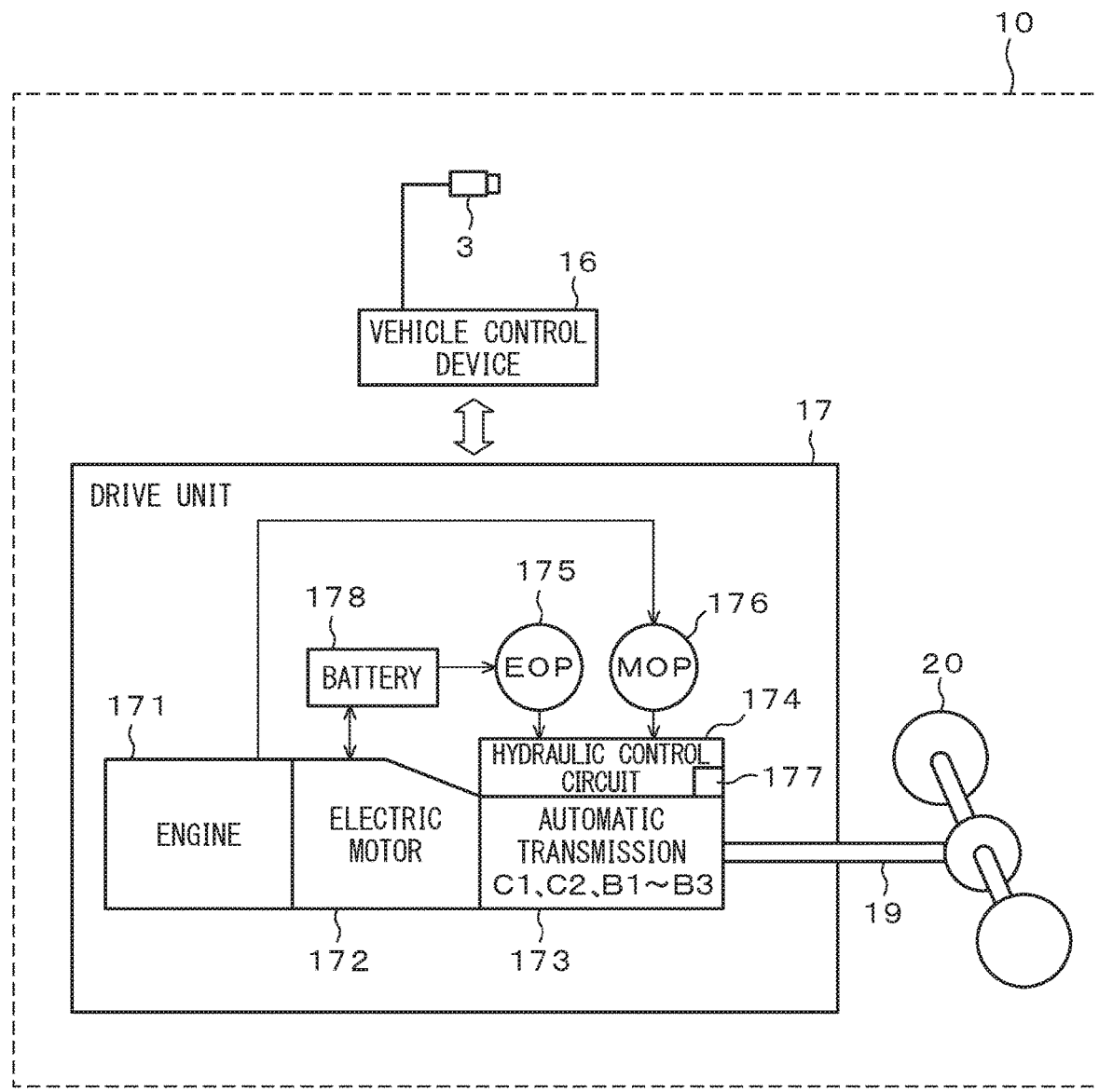
FIG. 1 is a diagram illustrating operation of a vehicle control device of the embodiment in overview.

FIG. 1 is a diagram illustrating operation of the vehicle control device 16 of the embodiment in overview. Operation relating to vehicle control processing by the vehicle control device 16 disclosed herein will now be described in overview with reference to FIG. 1.

The vehicle 10 has a vehicle control device 16 and a drive unit 17. The vehicle control device 16 controls the drive unit 17 based on a predetermined driving plan. The drive unit 17 has an engine 171, an electric motor 172 and an automatic transmission 173. The vehicle 10 is a type known as a hybrid vehicle. The vehicle 10 may be an autonomous vehicle.

The drive unit 17 is controlled by the vehicle control device 16 to regulate output from the engine 171 and electric motor 172. The drive unit 17 is also controlled by the vehicle control device 16 to regulate the gear stage or speed ratio of the automatic transmission 173. Output from the engine 171 and electric motor 172 is converted by the automatic transmission 173 to rotary force with a predetermined rotational speed, and is transmitted to the tires 20 via an output shaft 19.

The engine 171 generates drive power by combustion of a fuel such as gasoline. The electric motor 172 generates drive power by supply of electric power from a battery 178.

The drive unit 17 has an electrical oil pump (EOP) 175 and a mechanical oil pump (MOP) 176. The electrical oil pump 175 and mechanical oil pump 176 are controlled by the vehicle control device 16 to supply hydraulic pressure to a hydraulic control circuit 174. The electrical oil pump 175 is actuated by an electric motor (not shown) to generate hydraulic pressure. The mechanical oil pump 176 is actuated by the engine 171 to generate hydraulic pressure. The automatic transmission 173 is controlled to engage and release clutches C1, C2 and brakes B1, B2, B3, by the hydraulic pressure supplied from the hydraulic control circuit 174.

The engine 171 is usually stopped when the vehicle 10 has been activated, and the vehicle control device 16 supplies hydraulic pressure that has been generated by the electrical oil pump 175 to the hydraulic control circuit 174.

For the purpose of the present specification, "when the vehicle 10 has been activated" means the state where the vehicle control device 16 and drive unit 17 can be operated but the first hydraulic pressure P1 allowing operation of the automatic transmission 173 has not been supplied to the automatic transmission 173. Since drive power during this time has not yet been transmitted to the tires 20, the vehicle 10 has not begun traveling.

After the vehicle 10 has been activated, the vehicle control device 16 estimates whether or not the driver is attempting to begin travel of the vehicle 10, based on a monitor image of the area near the driving seat taken by a monitoring camera 3.

When it has been estimated that the driver is not attempting to begin travel of the vehicle 10, the vehicle control device 16 controls the electrical oil pump 175 to supply a second hydraulic pressure P2 that is lower than the first hydraulic pressure P1 which allows operation of the automatic transmission 173 having frictional engagement elements that can be engaged and disengaged by hydraulic pressure (the clutches C1, C2 and brakes B1, B2, B3, etc.). The second hydraulic pressure P2 may also be zero. In this case, the electrical oil pump 175 is controlled so that hydraulic pressure is not generated.

When the vehicle control device 16 has estimated that the driver is attempting to begin travel of the vehicle 10, on the other hand, the vehicle control device 16 controls the electrical oil pump 175 to supply the first hydraulic pressure P1 to the automatic transmission 173. The hydraulic control circuit 174 is controlled by the vehicle control device 16 so that the first hydraulic pressure P1 which allows operation of the automatic transmission 173 is supplied to the automatic transmission 173. This causes the output of the electric motor 172 to be transmitted to the tires 20 via the automatic transmission 173, to allow travel.

As explained above, during the period after the vehicle 10 has been activated and until it is estimated that the driver is attempting to begin travel of the vehicle 10, the vehicle control device 16 of this embodiment controls the electrical oil pump 175 to supply the second hydraulic pressure P2 that is lower than the first hydraulic pressure P1 which allows operation of the automatic transmission 173, thus allowing electric power consumption from the battery 178 to be reduced.

Figure 2:
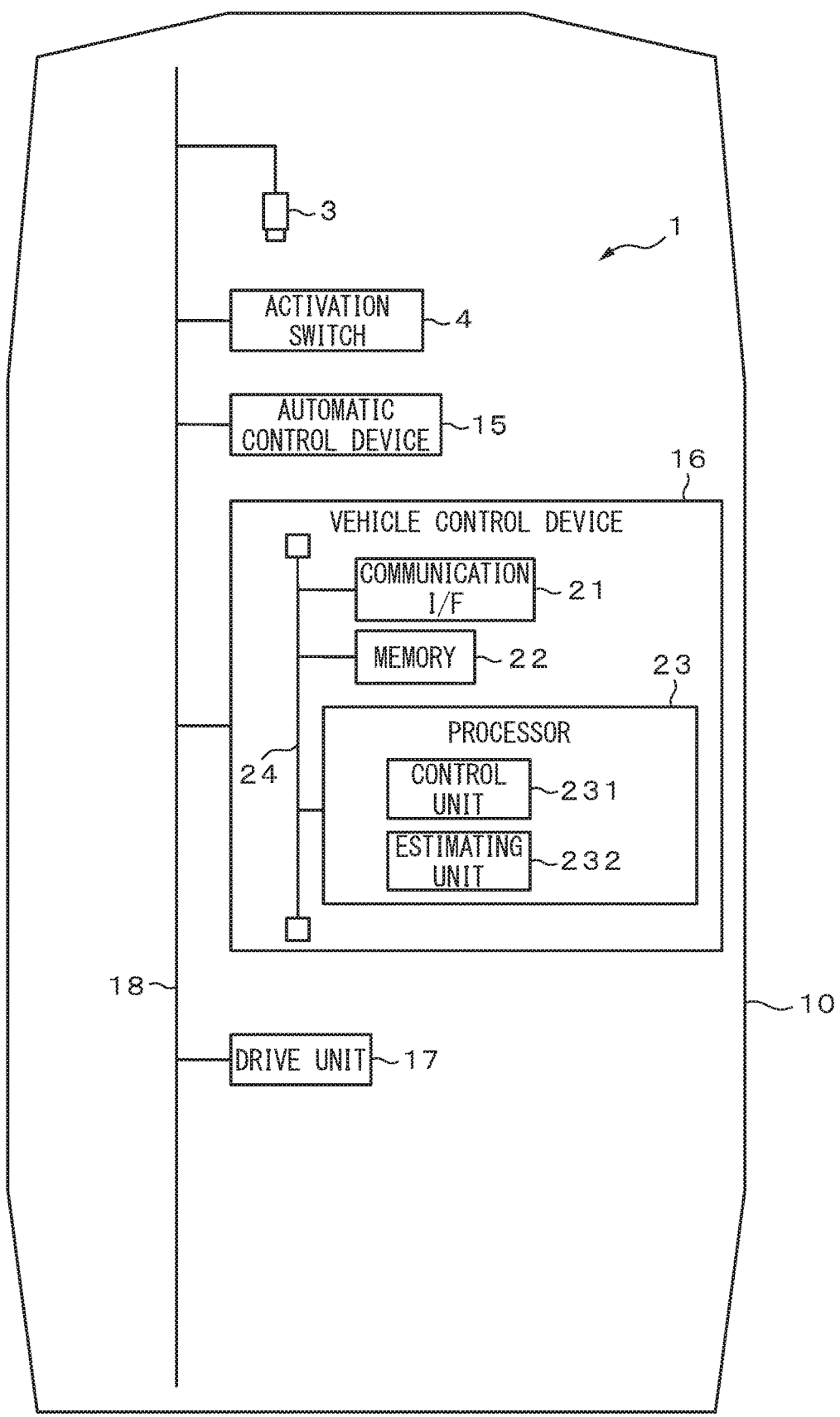
FIG. 2 is a general schematic drawing of a vehicle in which the vehicle control device of the embodiment is mounted.

FIG. 2 is a general schematic drawing of a vehicle 10 in which the vehicle control device 16 of the embodiment is mounted. The vehicle control system 1 has a monitoring camera 3, an activation switch 4, an automatic control device 15, a vehicle control device 16 and a drive unit 17.

The monitoring camera 3, activation switch 4, automatic control device 15, vehicle control device 16 and drive unit 17 are connected in a communicable manner via an in-vehicle network 18 conforming to the Controller Area Network standard.

The monitoring camera 3 is disposed in the vehicle compartment in a manner allowing it to photograph the area near the driving seat (not shown). Monitor images representing the area near the driving seat that have been taken by the monitoring camera 3 may include the face of the driver who is driving the vehicle 10. The monitoring camera 3 is an example of a photographing device that takes monitor images.

The monitoring camera 3 photographs a monitor image including the face of the driver by photographing the area around the driving seat 31 at a monitor imaging time with a predetermined cycle. The predetermined cycle may be 0.1 to 1.0 second, for example. The predetermined cycle is not limited to this time range, however. Each time a monitor image is taken, the monitoring camera 3 outputs the monitor image and monitor imaging time to the vehicle control device 16, etc. via the in-vehicle network 18.

The monitoring camera 3 has a 2D detector composed of an array of photoelectric conversion elements with infrared sensitivity, such as a CCD or C-MOS, and an imaging optical system that forms an image of the photographed region on the 2D detector. The monitoring camera 3 preferably has a lighting device in addition to the 2D detector. The lighting device is an LED (light emitting diode), and for example, it may consist of two near-infrared LEDs situated on either side of the imaging optical system. Illuminating the driver with near-infrared light allows the driver's face to be photographed without causing discomfort for the driver even during low-illuminance periods such as nighttime.

The activation switch 4 is disposed in the vehicle compartment so as to allow operation by the driver seated in the driving seat. The activation switch 4 generates an operation signal in response to the driver operation and outputs the operation signal to the automatic control device 15 and vehicle control device 16, etc. via the in-vehicle network 18. Based on the operation signal, the vehicle 10 transitions to an accessory on state, an ignition on state and an actuatable state for the engine 171 and/or electric motor 172.

The automatic control device 15 has an automatic control mode in which the vehicle 10 is driven primarily by the automatic control device 15, and a manual control mode in which the vehicle 10 is driven primarily by the driver. In automatic control mode, the automatic control device 15 generates a driving plan for control of actions such as steering, engine actuation and braking, etc. based on detection information from a sensor (not shown) mounted in the vehicle 10, and outputs the driving plan to the vehicle control device 16 via the in-vehicle network 18.

In manual control mode, the automatic control device 15 generates a manual control signal for control of actions of the vehicle 10 such as steering, engine actuation and braking, etc. based on operation by the driver, and outputs the manual control signal to the vehicle control device 16.

In automatic control mode, driving is primarily executed by the automatic control device 15. Automatic control mode may also include driving at the self-driving levels of 2 to 5. In manual control mode, driving is primarily executed by the driver. Manual control mode may also include driving at the self-driving levels of 0 to 1.

Automatic control mode can be carried out in regions where a high precision map is available for control of the vehicle 10. When the point where the vehicle 10 has been activated is in a region where the high precision map is not available, therefore, the driver drives the vehicle 10 in manual control mode, with the vehicle 10 being able to travel under automatic control mode after having traveled to a region where the high precision map is available.

The vehicle control device 16 carries out control processing and estimation processing. For this purpose, the vehicle control device 16 has a communication interface (IF) 21, a memory 22 and a processor 23. The communication interface 21, memory 22 and processor 23 are connected via signal wires 24. The communication interface 21 has an interface circuit to connect the vehicle control device 16 with the in-vehicle network 18.

The memory 22 is an example of a memory unit, and it has a volatile semiconductor memory and a non-volatile semiconductor memory, for example. The memory 22 stores an application computer program and various data to be used for information processing carried out by the processor 23 of each device.

All or some of the functions of the vehicle control device 16 are carried out by functional modules driven by a computer program operating on the processor 23, for example. The processor 23 has a control unit 231 and an estimating unit 232. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit.

In automatic control mode, the control unit 231 controls each unit of the vehicle 10 based on the current location of the vehicle 10 and the vehicle speed and yaw rate, as well as on the driving plan generated by the automatic control device 15. For example, the control unit 231 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The control unit 231 also outputs a control signal corresponding to a set steering amount, to an actuator (not shown) that controls the steering wheel for the vehicle 10, via the in-vehicle network 18. The vehicle control device 16 also outputs a control signal corresponding to the set accelerator level, to the drive unit 17 of the vehicle 10, via the in-vehicle network 18. Alternatively, the vehicle control device 16 may output a control signal corresponding to a set brake level to the brake (not shown) of the vehicle 10, via the in-vehicle network 18.

In manual control mode, the control unit 231 controls each unit of the vehicle 10 based on manual control signals generated by the automatic control device 15. Details regarding operation by the vehicle control device 16 will be described in detail below.

As shown in FIG. 1, the drive unit 17 has an engine 171, an electric motor 172, an automatic transmission 173, a hydraulic control circuit 174, an electrical oil pump 175, a mechanical oil pump 176, an oil temperature sensor 177 and a battery 178.

Operation of the rotational speed of the engine 171 and electric motor 172 is controlled by the vehicle control device 16. The gear stage or speed ratio of the automatic transmission 173 is also controlled by the vehicle control device 16. The gear stage or speed ratio of the automatic transmission 173 can be set according to the speed of the vehicle 10 and the required rotary force (torque). For example, when the speed of the vehicle 10 and gear stage are set, the rotational speed output from the electric motor 172 to the automatic transmission 173 becomes set, and this rotational speed is used as the basis for appropriately setting the rotational speed output from the engine 171 to the electric motor 172. It is often the case when the vehicle 10 is traveling at a constant speed under low load, that the engine 171 is stopped and drive power is obtained from the electric motor 172. The electric motor 172 may also consist of several motors.

The gear stage and speed ratio of the automatic transmission 173 are controlled by engagement and release of the clutches C1, C2 and brakes B1, B2, B3 by the hydraulic pressure from the hydraulic control circuit 174.

The electrical oil pump 175 or mechanical oil pump 176 supplies hydraulic pressure to the hydraulic control circuit 174. The hydraulic control circuit 174 controls the hydraulic pressure supplied to the automatic transmission 173 in response to a friction material hydraulic pressure command output from the vehicle control device 16, thereby allowing the gear stage or speed ratio to be controlled.

The electrical oil pump 175 and mechanical oil pump 176 can supply the first hydraulic pressure P1 which allows engagement and disengagement of the clutches C1, C2 and brakes B1, B2, B3, to the automatic transmission 173.

The mechanical oil pump 176 is actuated by an engine 171 to generate hydraulic pressure. The vehicle control device 16 usually stops the engine 171 when the vehicle 10 has been activated, and supplies hydraulic pressure that has been generated by the electrical oil pump 175 to the hydraulic control circuit 174. Since the engine 171 is therefore usually stopped when the vehicle 10 has been activated, the mechanical oil pump 176 is also stopped.

When the vehicle 10 has been activated and the storage level of the battery 178 is below a predetermined reference storage level, the vehicle control device 16 actuates the engine 171 and charges the battery 178 by electric power generated by the electric motor 172. In this case, the vehicle control device 16 stops the electrical oil pump 175 and supplies hydraulic pressure generated by the mechanical oil pump 176 to the hydraulic control circuit 174.

The oil temperature sensor 177 detects the oil temperature in the hydraulic control circuit 174 and outputs the oil temperature to the vehicle control device 16 via the in-vehicle network 18.

The automatic control device 15 and vehicle control device 16 are electronic control units (ECU), for example. For FIG. 2, the automatic control device 15 and the vehicle control device 16 were described as separate devices, but these may also be constructed as a single device.

Figure 3:
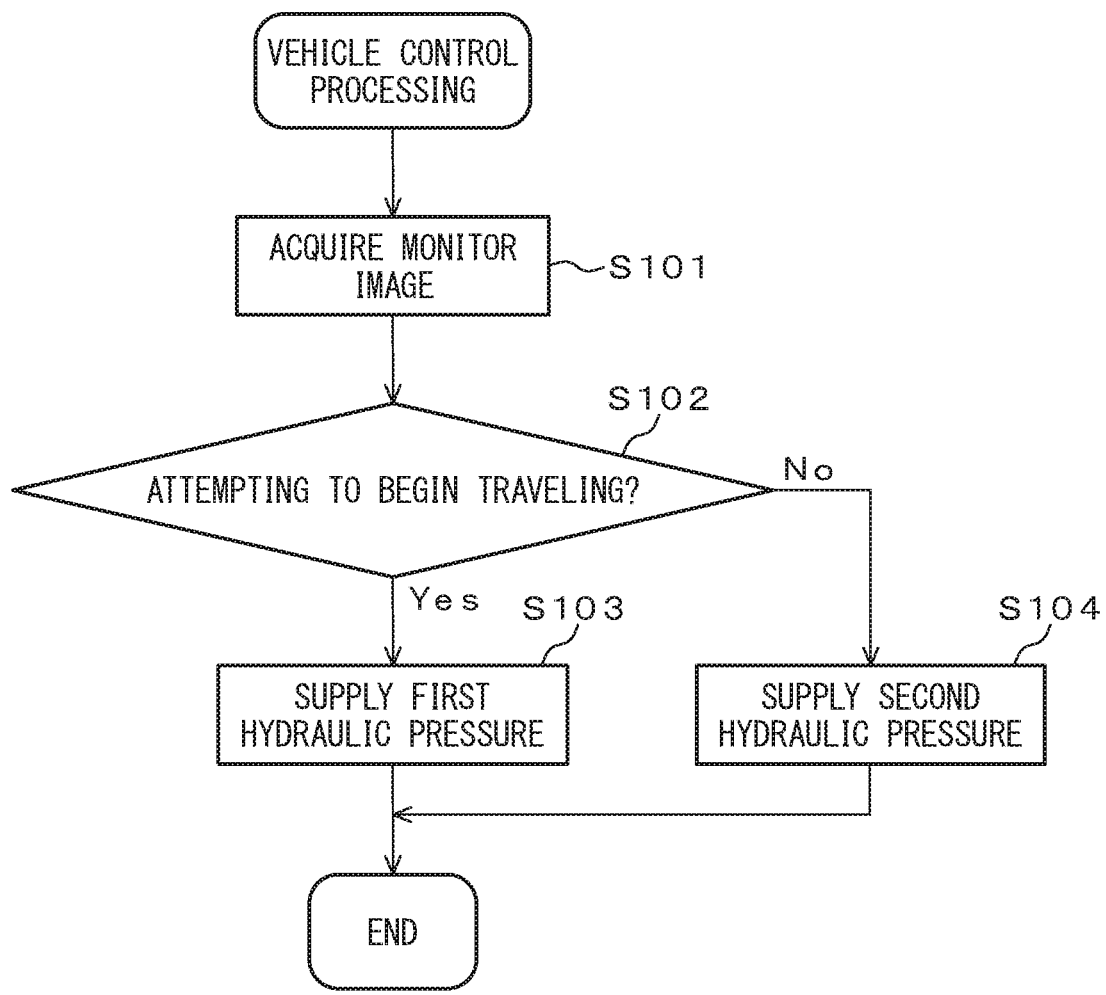
FIG. 3 is an example of an operation flow chart for vehicle control processing by the vehicle control device of the embodiment.

FIG. 3 is an example of an operation flow chart for vehicle control processing by the vehicle control device 16 of the embodiment. Vehicle control processing by the vehicle control device 16 will be described below with reference to FIG. 3. After having activated the vehicle 10, the vehicle control device 16 carries out vehicle control processing according to the operation flow chart shown in FIG. 3, at a vehicle control time with a predetermined cycle. The cycle for the vehicle control time is preferably at least the length of the cycle for the monitor imaging time.

The estimating unit 232 first acquires a monitor image that has been taken by the monitoring camera 3 (step S101). The area near the driving seat is shown in the monitor image, and may include the face of the driver.

The estimating unit 232 then estimates whether or not the driver is attempting to begin travel of the vehicle 10, based on the monitor image (step S102). This estimation processing is described in detail below.

When it has been estimated that the driver is attempting to begin travel of the vehicle 10 (step S102—Yes), the control unit 231 decides to supply the first hydraulic pressure P1 to the automatic transmission 173 (step S103), and the series of processing steps is complete. The control unit 231 controls the electrical oil pump 175 to supply the automatic transmission 173 with the first hydraulic pressure P1 which allows operation of the automatic transmission 173. The vehicle 10 can thus begin to travel.

When it has been estimated that the driver is not attempting to begin travel of the vehicle 10 (step S102—No), on the other hand, the control unit 231 decides to supply the second hydraulic pressure P2 which is lower than the first hydraulic pressure P1 (step S104), and the series of processing steps is complete. The control unit 231 controls the electrical oil pump 175 to supply the automatic transmission 173 with the second hydraulic pressure P2. A lower second hydraulic pressure P2 is preferred from the viewpoint of reducing electric power consumption. A higher second hydraulic pressure P2, on the other hand, is preferred from the viewpoint of rapidly supplying the first hydraulic pressure to the automatic transmission 173 when it has been estimated that the driver is attempting to begin travel of the vehicle 10. The second hydraulic pressure P2 can be set in a range of 20% to 80% of the first hydraulic pressure P1, for example. The second hydraulic pressure P2 may also be zero. In this case, the electrical oil pump 175 is controlled so that hydraulic pressure is not generated.

Figure 4:
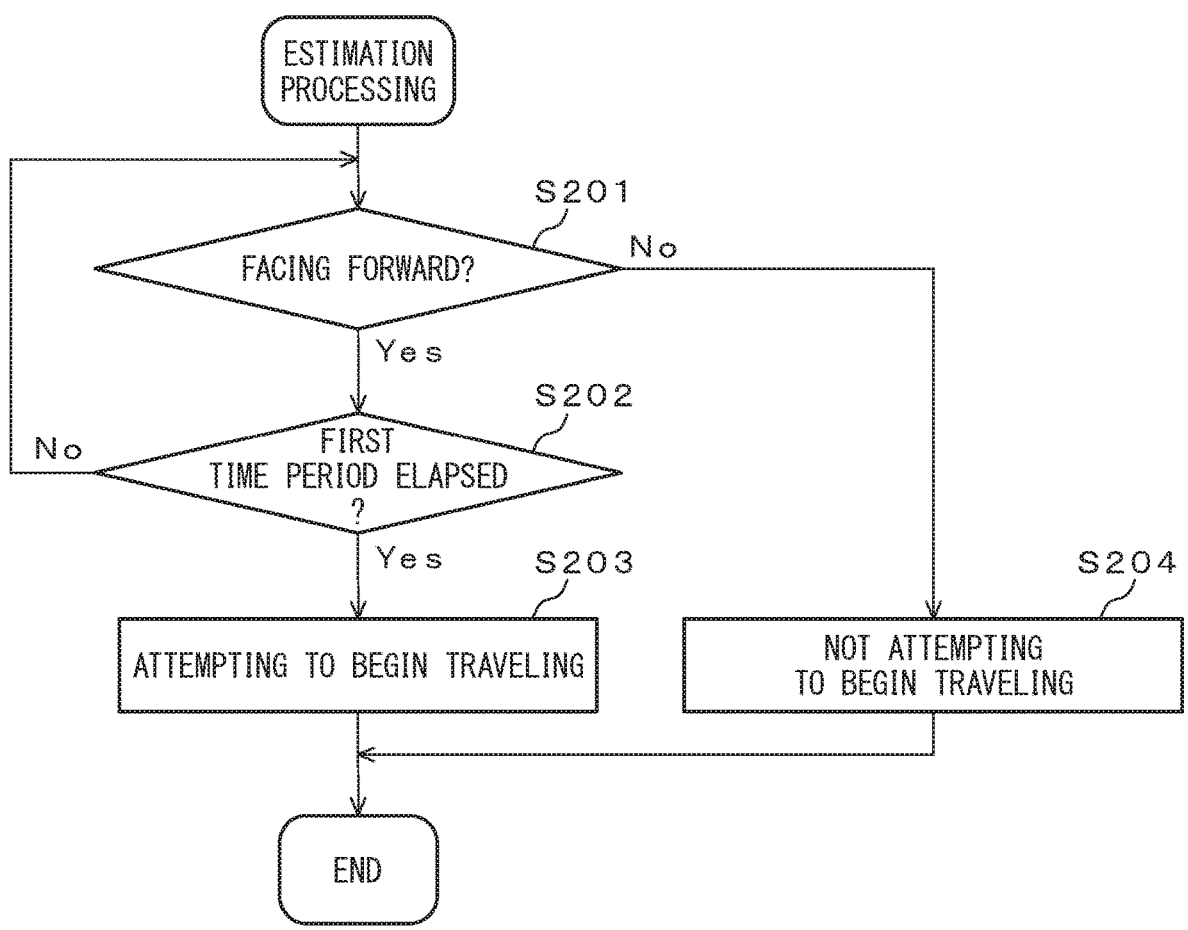
FIG. 4 is an example of an operation flow chart for estimation processing by the vehicle control device of the embodiment.

FIG. 4 is an example of an operation flow chart for estimation processing by the vehicle control device of the embodiment. In step S102 described above, the estimating unit 232 estimates whether or not the driver is attempting to begin travel of the vehicle 10, according to the operation flow chart shown in FIG. 4.

First, the estimating unit 232 determines whether or not the face of the driver is oriented toward the front of the vehicle 10 (step S201). The orientation of the face of the driver is represented by the angles in the horizontal direction and vertical direction between the traveling direction of the vehicle 10 and the direction in which the face of the driver is facing, for example. The estimating unit 232 has a classifier that has been trained to detect facial aspects such as eye corners, inner eye corners and cheilions from images. The estimating unit 232 inputs monitor images into the classifier to determine the locations of predetermined facial aspects in the monitor images. The estimating unit 232 also compares the locations of the predetermined facial aspects detected from the monitor image against a standard facial three-dimensional model. The angle of the face in a three-dimensional model in which the location of each facial aspect maximally matches the aspect location detected from the monitor image is detected as the angle of the face in the monitor image.

The classifier may be a convolutional neural network (CNN) having multiple layers connected in series from the input end to the output end, for example. Facial images including predetermined facial aspects are previously input into the CNN as teacher data for learning, whereby the CNN functions as a classifier to identify the locations of predetermined facial aspects.

Publicly known technology may also be used to determine the orientation of the face of the driver based on monitor images. For example, the technology disclosed in Japanese Unexamined Patent Publication No. 2019-87150 may be used. The estimating unit 232 may also estimate the direction of the driver's line of sight, using the direction of the driver's line of sight as the orientation of the face of the driver.

The estimating unit 232 determines that the driver is facing the front of the vehicle 10 if, for example, the angle of orientation of the face of the driver is within a predetermined angle (such as 30°) either to the left or right with respect to the front as the traveling direction of the vehicle 10 and is within a predetermined angle (such as 15°) either above or below with respect to the traveling direction of the vehicle 10.

When the orientation of the face of the driver is toward the front of the vehicle 10 (step S201—Yes), the estimating unit 232 determines whether or not a state in which the orientation of the face of the driver is oriented toward the front of the vehicle 10 has continued for a first time period T1 (step S203).

If the face of the driver has been oriented toward the front of the vehicle 10 for the length of the first time period T1 (step S202—Yes), the estimating unit 232 estimates that the driver is attempting to begin travel of the vehicle 10 (step S202), and the series of processing steps is complete. If the face of the driver has not been oriented toward the front of the vehicle 10 for the length of the first time period T1 (step S202—No), processing returns to step S201.

If the orientation of the face of the driver is not toward the front of the vehicle 10 (step S201—No), on the other hand, the estimating unit 232 estimates that the driver is not attempting to begin travel of the vehicle 10 (step S204), and the series of processing steps is complete.

FIG. 5(A) to FIG. 5(F) show examples of timing charts for illustration of vehicle control processing by the vehicle control device 16 of the embodiment. Vehicle control processing by the vehicle control device 16 will now be explained with reference to the timing charts shown in FIG. 5.

Figure 5A:
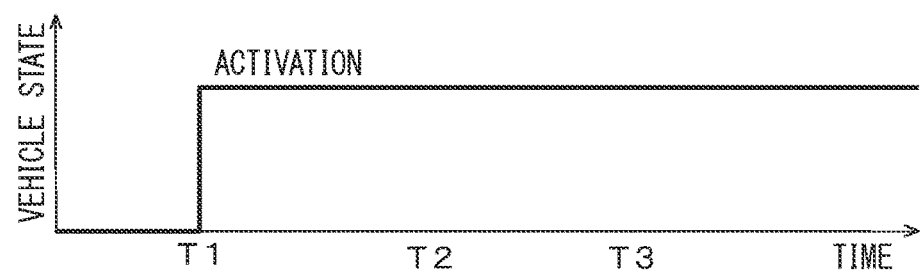
FIG. 5(A) to FIG. 5(F) show examples of timing charts for illustration of vehicle control processing by the vehicle control device of the embodiment.
Figure 5B:
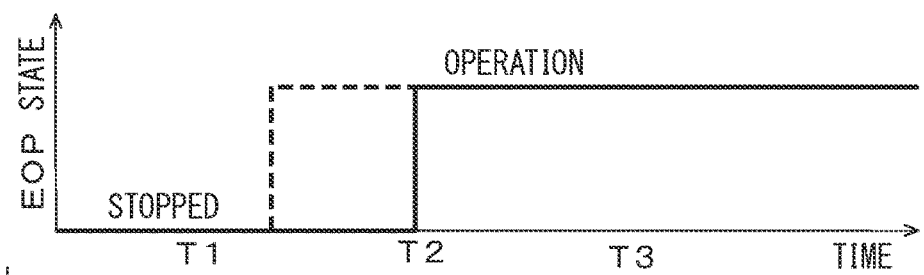
Figure 5C:
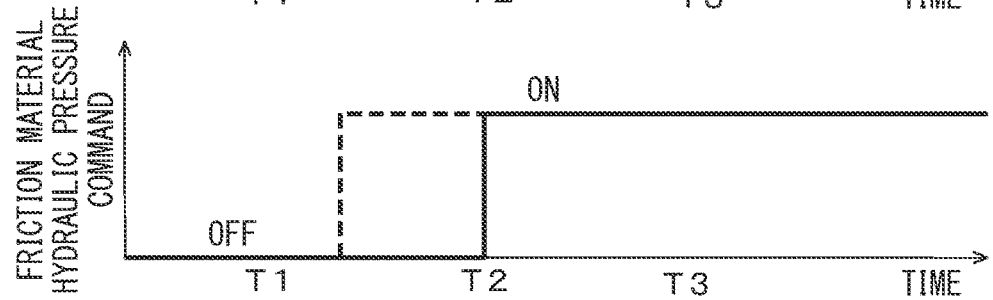
Figure 5D:
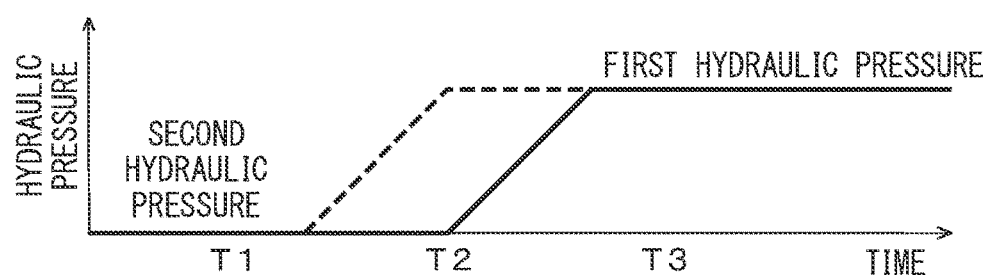
Figure 5E:
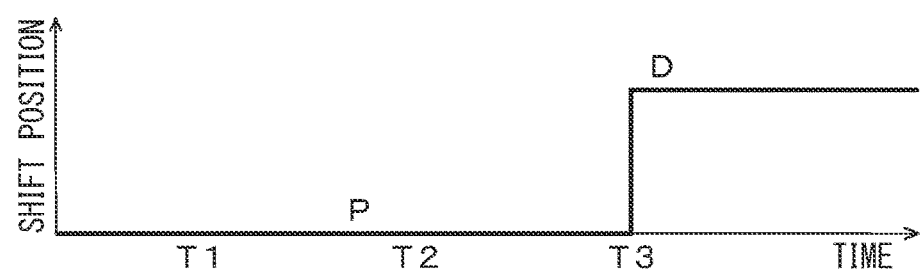
Figure 5F:
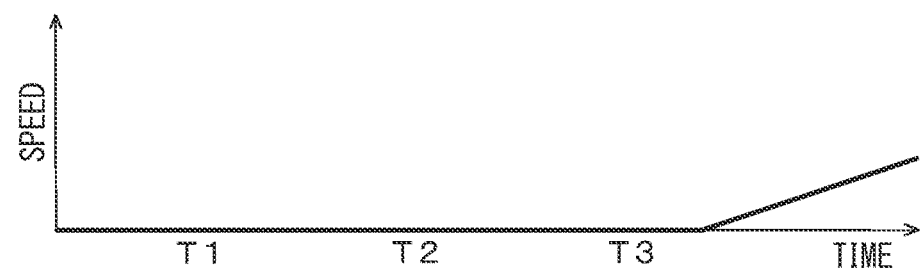

FIG. 5(A) shows the relationship between vehicle 10 state and time, FIG. 5(B) shows the relationship between electrical oil pump 175 state and time, and FIG. 5(C) shows the relationship between friction material hydraulic pressure command and time. FIG. 5(D) shows the relationship between hydraulic pressure supplied to the automatic transmission 173 and time, FIG. 5(E) shows the relationship between shift position and time, and FIG. 5(F) shows the relationship between speed of the vehicle 10 and time.

First, as shown in FIG. 5(A), the driver operates the activation switch 4, activating the vehicle 10 at time T1. The vehicle control device 16 estimates that the driver is not attempting to begin travel of the vehicle 10. The vehicle control device 16 also decides to supply the second hydraulic pressure P2 that is lower than the first hydraulic pressure P1 which allows operation of the automatic transmission 173. At this time, the vehicle control device 16 has the electrical oil pump 175 in a stopped state. Incidentally, the vehicle control device 16 may also actuate the electrical oil pump 175 to supply the second hydraulic pressure P2 that is lower than the first hydraulic pressure P1 to the automatic transmission 173.

As shown in FIG. 5(B), at time T2, the vehicle control device 16 estimates that the driver is attempting to begin travel of the vehicle 10. The vehicle control device 16 operates the electrical oil pump 175 to begin supply of the automatic transmission 173 with the first hydraulic pressure P1.

In addition, as shown in FIG. 5(C), the vehicle control device 16 outputs a friction material hydraulic pressure command to the hydraulic control circuit 174 to switch to first gear (friction material hydraulic pressure command ON). In response, the hydraulic pressure of the automatic transmission 173 increases to the first hydraulic pressure P1, as shown in FIG. 5(D).

As shown in FIG. 5(E), at time T3, the driver operates the shift selector (not shown) to change the shift position from P range to D range. Output from the electric motor 172 is converted by the automatic transmission 173 to rotary force with a predetermined rotational speed, and is transmitted to the tires 20 via an output shaft 19. The speed of the vehicle 10 gradually increases in response, as shown in FIG. 5(F).

In the example of vehicle control processing described above, the electrical oil pump 175 either stops during the period from time T1 to time T2, or is controlled to supply lower hydraulic pressure than the first hydraulic pressure, thus allowing electric power consumption to be reduced.

In contrast, when the electrical oil pump 175 has been operated immediately after activation of the vehicle 10, as represented by the dot and dash line in FIG. 5(B), the first hydraulic pressure P1 is supplied to the automatic transmission 173 in response. Therefore, a greater amount of electric power is consumed by operation of the electrical oil pump 175 until the time that the driver changes the shift position from P range to D range at time T3.

As explained above, during the period after the vehicle has been activated and until it is estimated that the driver is attempting to begin travel of the vehicle, the vehicle control device of this embodiment controls the electrical oil pump to supply a lower hydraulic pressure than the hydraulic pressure which allows operation of the transmission, thus allowing electric power consumption from the battery to be reduced.

The vehicle control device, the computer program for vehicle control and the method for controlling a vehicle according to the embodiment described above may incorporate appropriate modifications that are still within the gist of the disclosure. Moreover, the technical scope of the disclosure is not limited to these embodiments, and includes the invention and its equivalents as laid out in the Claims.

For example, the estimating unit 232 may estimate that the driver is attempting to begin travel of the vehicle 10 if the face of the driver is oriented toward the front of the vehicle 10 for a second time period T2 that is shorter than the first time period T1, when the temperature of the oil that causes operation of the automatic transmission 173 is lower than a predetermined reference temperature. Since a low oil temperature increases the viscosity of the oil, more time is required for the hydraulic pressure of the automatic transmission 173 to increase in response to a friction material hydraulic pressure command. By shortening the time required for estimation, therefore, the hydraulic pressure is increased earlier and the vehicle 10 is brought to a travel-capable state more rapidly.

When the vehicle 10 has been activated and the storage level of the battery 178 is below a predetermined reference storage level, the vehicle control device 16 actuates the engine 171 and charges the battery 178 by electric power generated by the electric motor 172. In this case, the vehicle control device 16 stops the electrical oil pump 175 and supplies hydraulic pressure generated by the mechanical oil pump 176 to the hydraulic control circuit 174. Thus, when the mechanical oil pump 176 is being operated while the vehicle 10 has been activated, the vehicle control device 16 may control the mechanical oil pump 176 to supply the second hydraulic pressure P2 that is lower than the first hydraulic pressure P1 when it has been estimated by the estimating unit 232 that the driver is not attempting to begin travel of the vehicle 10, and to control the mechanical oil pump 176 to supply the first hydraulic pressure P1 to the automatic transmission 173 when it has been estimated by the estimating unit 232 that the driver is attempting to begin travel of the vehicle 10.

The invention claimed is:

1. A vehicle control device comprising:
   a processor configured to
      estimate whether or not a driver is attempting to begin vehicle travel after a vehicle has been activated, based on a photographed image of an area near a driving seat, and
      control an electrical oil pump to supply a second hydraulic pressure that is lower than a first hydraulic pressure which allows operation of a transmission having a frictional engagement element that can be engaged and disengaged by hydraulic pressure, when it has been estimated that the driver is not attempting to begin vehicle travel, or control the electrical oil pump to supply the first hydraulic pressure to the transmission, when it has been estimated that the driver is attempting to begin vehicle travel.

2. The vehicle control device according to claim 1, wherein the processor is further configured to estimate an orientation of a face of the driver based on the image, and estimate that the driver is attempting to begin vehicle travel when the face of the driver is oriented toward a front of the vehicle for a first time period.

3. The vehicle control device according to claim 2, wherein the processor is further configured to estimate that the driver is attempting to begin vehicle travel when the face of the driver is oriented toward the front of the vehicle for a second time period that is shorter than the first time period, if a temperature of an oil that causes the transmission to operate is lower than a predetermined reference temperature.

4. A computer-readable, non-transitory storage medium storing a computer program for vehicle control, which causes a processor execute a process, and the process comprising:

estimating whether or not a driver is attempting to begin vehicle travel after a vehicle has been activated, based on a photographed image of an area near a driving seat; and controlling an electrical oil pump to supply a second hydraulic pressure that is lower than a first hydraulic pressure which allows operation of a transmission having a frictional engagement element that can be engaged and disengaged by hydraulic pressure, when it has been estimated that the driver is not attempting to begin vehicle travel, or controlling the electrical oil pump to supply the first hydraulic pressure to the transmission, when it has been estimated that the driver is attempting to begin vehicle travel.

5. A method for controlling a vehicle carried out by a vehicle control device, and the method comprising:

estimating whether or not a driver is attempting to begin vehicle travel after a vehicle has been activated, based on a photographed image of an area near a driving seat; and controlling an electrical oil pump to supply a second hydraulic pressure that is lower than a first hydraulic pressure which allows operation of a transmission having a frictional engagement element that can be engaged and disengaged by hydraulic pressure, when it has been estimated that the driver is not attempting to begin vehicle travel, or controlling the electrical oil pump to supply the first hydraulic pressure to the transmission, when it has been estimated that the driver is attempting to begin vehicle travel.

\* \* \* \* \*